US007298313B1

(12) United States Patent
Fiden et al.

(10) Patent No.: US 7,298,313 B1
(45) Date of Patent: Nov. 20, 2007

(54) RADAR-COMPATIBLE DATA LINK SYSTEM (U)

(75) Inventors: William H. Fiden, Woodland Hills, CA (US); Donald Walter Czubiak, Westlake Village, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 05/626,674

(22) Filed: Oct. 28, 1975

(51) Int. Cl.
    *G01S 13/86* (2006.01)
(52) U.S. Cl. .......................... 342/57; 342/58; 342/103
(58) Field of Classification Search ................. 343/7.6; 342/50, 52, 57, 58, 103
    See application file for complete search history.

(56) References Cited

U.S. PATENT DOCUMENTS

| | | | | | |
|---|---|---|---|---|---|
| 2,407,199 | A | * | 9/1946 | Wolff ........................... | 342/60 |
| 2,444,452 | A | * | 7/1948 | Labin .......................... | 342/60 |
| 2,484,798 | A | * | 10/1949 | Bradley ....................... | 342/52 |
| 2,495,737 | A | * | 1/1950 | Labin et al. ................. | 342/43 |
| 2,542,182 | A | * | 2/1951 | Crump ........................ | 342/60 |
| 2,594,305 | A | * | 4/1952 | Haller ...................... | 343/7.6 X |
| 2,709,773 | A | * | 5/1955 | Getting et al. ........... | 343/7.6 X |
| 2,885,667 | A | * | 5/1959 | Downey et al. .............. | 342/60 |
| 2,903,675 | A | * | 9/1959 | Downey et al. ............ | 714/750 |
| 2,932,021 | A | * | 4/1960 | Chaffee ........................ | 342/59 |
| 2,980,903 | A | * | 4/1961 | Hagopian et al. ............. | 342/60 |
| 3,147,476 | A | * | 9/1964 | Stodola ........................ | 342/95 |
| 3,550,124 | A | * | 12/1970 | Heft et al. ................... | 342/58 |
| 3,727,216 | A | * | 4/1973 | Antonio ....................... | 342/28 |
| 4,052,722 | A | * | 10/1977 | Millard ....................... | 342/115 |
| 4,063,237 | A | * | 12/1977 | Nier et al. ..................... | 342/6 |

\* cited by examiner

*Primary Examiner*—John B Sotomayor
(74) *Attorney, Agent, or Firm*—David S. Kalmbaugh

(57) ABSTRACT

The invention provides a radar system capable of transmitting data communications concurrently with and on a non-interfering basis with the normal radar functions. A continuous-wave carrier frequency is generated and transmitted to perform the normal radar function such as the processing of doppler data. For data communication purposes, the carrier signal is pulse modulated at selected pulse repetition frequencies with the selected PRF transmitted as first-order sideband components of the fixed carrier frequency. PRF selection is made in accordance with input digital data. A remotely-disposed command link receiver processes the incoming carrier wave and its sideband components to reconstruct the information contained in the transmitted data rates. Sensitivity and optimum detection by the command link receiver is achieved in a special manner that includes a phase locking of the received carrier frequency to the generated carrier frequency.

6 Claims, 3 Drawing Sheets

RADAR-COMPATIBLE DATA LINK SYSTEM
(U)

BACKGROUND OF THE INVENTION

The present invention relates to radar systems and, in particular, to systems having a communication capability added to its designed radar capability.

Systems of the type under consideration are used for a number of purposes one of which is to track semi-active radar guided missiles or the like and, as needed, to transmit course-correction commands or the like over a data link. By way of illustration, such a system may utilize pulse doppler radar and, to achieve the desired data communication capability, some type of carrier frequency modulation is employed. However, since the carrier frequency itself is modulated the radar function must be interrupted during each message transmission. In other words, the radar transmitter must be time-shared between the radar and the data link functions. Similar situations exist in comparable systems such as those used for secure communication purposes or for IFF interogatoins. For example, secure communication radars may employ a highly directional transmitter antenna for message purposes but, again the transmitter must be time-shared rather than being continuously available for uninterrupted operation in either mode.

According to the present invention, a radar compatible data link system is provided by utilizing pulse repetition modulation (PRF) for the data link function. More specifically, the transmitter section of the system generates and transmits a radar carrier wave the transmitted frequency of which remains intact or unmodulated to permit the radar function to continue unaffected by the data transmission. As indicated, PRF modulation provides the data link capability and, for this purpose, the system utilizes a plurality of PRF generators of differing repetition rates. The output of theses generators are selectively applied to pulse modulate the carrier wave. A digital input, in turn, controls the selection of the PRF generators to the extent that, for example, a binary '1' will select one of the generators, while a binary '0' will select another. The transmitted wave thus has the unmodulated carrier frequency to provide the radar function. It also contains the message data in the PRF sideband components of the wave. A command receiver selectively processes the sideband information to reconstruct the digital data.

DESCRIPTION OF THE DRAWINGS

The invention is illustrated in the accompanying drawings of which.

DETAILED DESCRIPTION OF THE INVENTION

Figure 1:
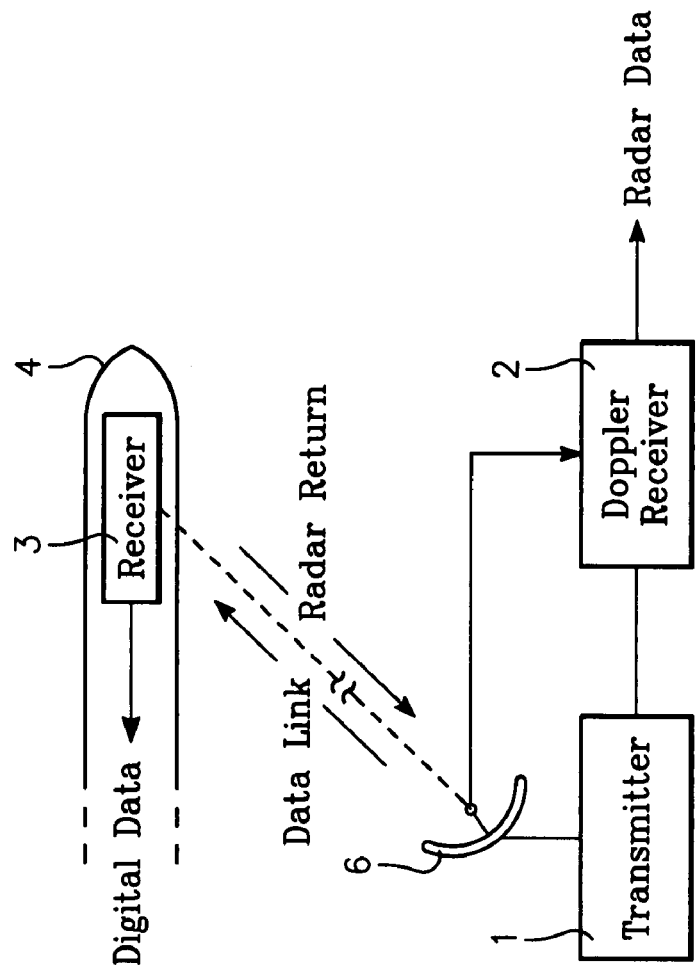
FIG. 1 is a schematic portrayal of one manner in which the present radar compatible link system is to be employed.

Referring to FIG. 1, the major components of the system include a radar signal transmitter 1, a radar return-signal receiver 2 and a command receiver 3 which, for illustrative purposes, is carried by a semi-active guided missile 4 the flight of which is being tracked and controlled by the radar. An antenna 6 transmits the radar signal and receives the return although, of course, separate antennas can be used for these two purposes. If security of the commands or communications received by command receiver 3 is a critical factor antenna 6 can be made highly directional by utilizing a dish antenna having about an appropriate beam width, such as a 1.5-20 width. The secure communication aspects of the present system are considered to be an important application of the inventive concept although, as indicated, the primary concept is to assure uninterrupted or, in other words, simultaneous functioning of both the data transmitting and the radar return processing of the system.

As will be appreciated, the present system is particularly suited for a doppler radar which is continuously receiving range data from a rapidly-moving vehicle and which also is adapted to transmit messages. According to well-known principles, the vehicle movement produces variations of the transmitted carrier wave and these variations are continuously integrated by the receiver to produce the desired radar data. Since the data is a function of the variations in the frequency of the transmitted carrier wave, it at least is highly preferably that the frequency of the carrier wave remain at a fixed value. As has been explained, the need for maintaining the carrier wave at a fixed frequency has seriously complicated the used of current pulsed doppler radars for communication purposes. The problem is that these current radars achieve their data communication capability by modulating or, in other words, actually varying the frequency of the carrier wave rather than permitting it to remain fixed. The result is that the doppler data processing must be interrupted during message transmission and, consequently, the transmitter of these current radars must be time shared. The present system avoids the difficulty by utilizing pulse repetition frequency (PRF) modulation to achieve the data communication capability and, since the carrier wave used for doppler or other radar purposes remains fixed or unmodulated, the radar functions can be performed on an uninterrupted basis.

Figure 2:
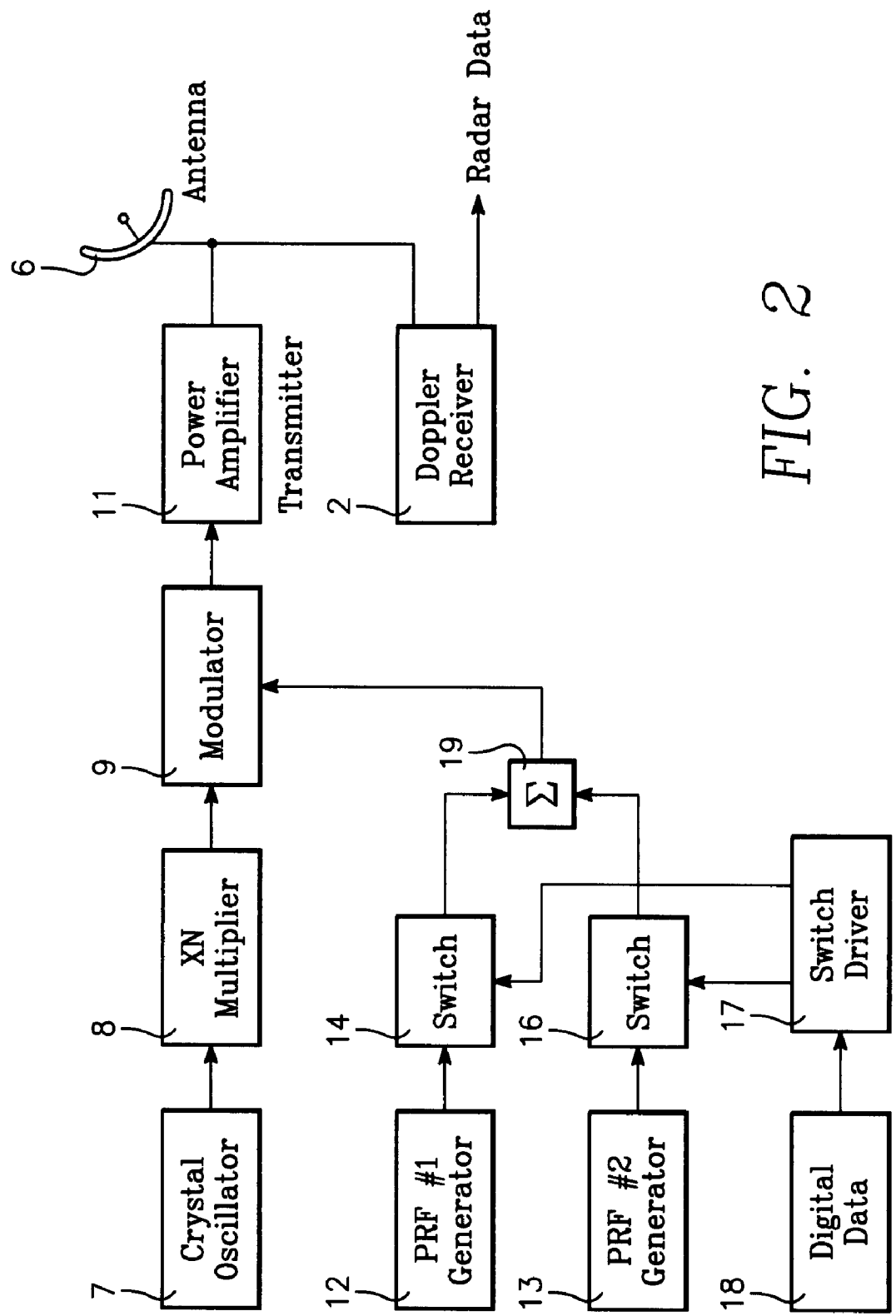
FIG. 2 is a block diagram of the radar transmitter section of the system.
Figure 3:
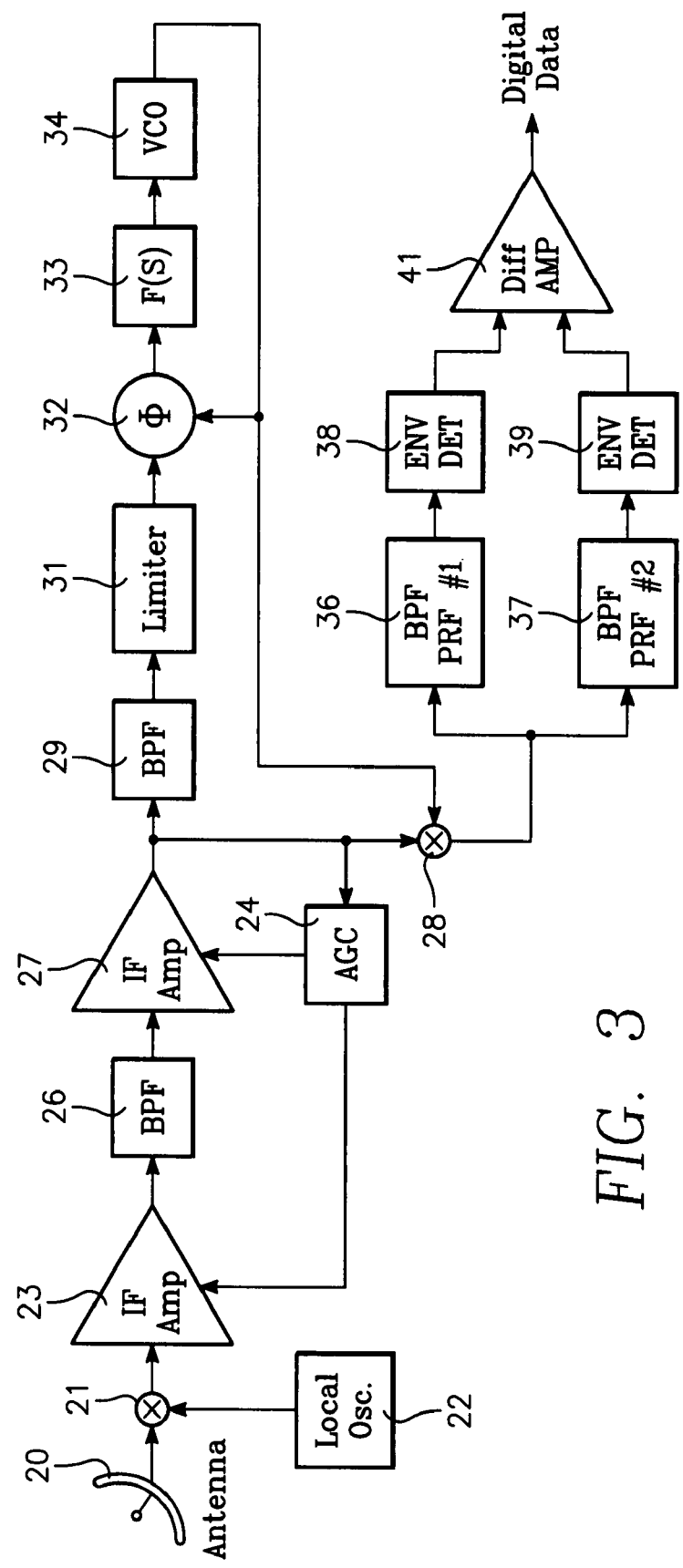
FIG. 3 is a block diagram of the command receiver section of the system.

The transmitter portion of the present system is illustrated in block form in FIG. 2. As will be noted each of the blocks of this figure, as well as FIG. 3, are functionally identified in the drawing. It also is to be noted that the various components used in the system may be provided in conventional manners so that actual implementation of the system should present no problem. In other words, all of the components of the present system are well-known, commercially-available items which should require no detailed identification or description. The operating characteristics of the system, of course, can be widely varied by component selection.

Referring to FIG. 2, it will be noted that the carrier wave to be transmitted by antenna 6 is derived in the usual manner from a crystal oscillator 7 the output frequency of which is multiplied by N in a multiplier 8 for application to a modulator 9 and a power amplifier 11.

A particular feature of the system resides in the manner in which the carrier wave is modulated. As explained, it is essential to the present invention that the frequency of the carrier wave remain at a fixed level so as to permit continuous use of the radar functions of the system. To achieve this purpose, the carrier signal is pulse modulated at a selected pulse repetition frequency (PRF) before being applied to power amplifier 11. As shown in FIG. 2, two PRF generators 12 and 13 are employed to pulse modulate the carrier. Functionally considered, one or the other of these generators selectively modulates the carrier and the generator selection is controlled by appropriate switches 14 and 16 which, in turn, are controlled by a switch driver 17 the operation of which is responsive to the binary state of digital data applied to the driver from a digital data source 18. A summer 19 is used at the outputs of switches 14 and 16, although as will be appreciated, the summer in the illustrated system simply is summing a '1' and a '0' format before application of the selected PRF to modulator 9. In other words, in the illustrated form, PRF selection is made in accordance with the input digital data to the extent that a logic "one" selects one PRF and a logic "zero" selects the other PRF with the transmitter being modulated at the selected PRF for the duration of the data link pulse. Consequently, the waveform transmitted by antenna 6 constitutes a series of pulses of the fixed carrier wave frequency derived from crystal oscillator 7 and the information or message data to be transmitted is contained in sideband components of the carrier wave. The net result is a transmission of a fixed carrier wave frequency at a repetition rate which is dependent upon the selected PRF generator so that the information contained in the transmitted signal resides in the transmitted data rate rather than an actual variation of the carrier wave frequency.

A command receiver, such as is shown in FIG. 3, is employed to derive digital data information by detecting the data rate of the incoming signal and reconstructing the applied digital data from variations in the pulse rate. This receiver, as stated, is carried by the missile or other object that is to receive the message data. Concurrently, the doppler or other radar return information is continuously and uninterruptedly obtained by receiver 2 of FIG. 2. Receiver 2, as has been indicated, may be considered as a doppler data receiver adapted to detect and continuously integrate variations in the fixed carrier wave frequency of the transmitter. Implementation of this receiver can be achieved in any of the well known manners, and, of course, it is anticipated that other types of radar return processors may be employed. It further should be appreciated that the system is shown in its simplest form in which only a pair of PRF generators is employed to transmit one bit of information per data link pulses. Clearly, however, the invention is equally applicable to more complex coding schemes which use more than two PRF's to transmit more than one bit of information per data link pulse.

Command receiver 3 is provided with a conventional antenna 20 to receive the signal transmitted by the FIG. 2 radar transmitter. This receiver generally is a superhetrodyne receiver using a linear AGC'd IF amplifier. More specifically, the incoming signal is mixed in a mixer 21 with the output of a local oscillator 22 and applied to an IF amplifier 23 controlled by an AGC component 24. The output of IF amplifier 23 then is applied to a bandpass filter 26 which is selected to pass both the carrier wave frequency and both first order sidebands produced by the pulse modulation. Preferably, the output of this filter is an AM signal with a modulation index greater than 1.0. Although not illustrated in FIG. 3, this requirement makes it possible to recover the PRF modulation after processing the received signal through a limiter IF amplifier instead of a linear IF amplifier. Although the use of the linear IF amplifier may produce greater sensitivity, the use of a limiter IF amplifier is somewhat less complex. Thus, as illustrated, IF amplifier 27 employed at the output of bandpass filter 26 can be of either type and, as shown, this amplifier also is AGC'd.

The AGC'd IF amplifier output is supplied to a mixer 28 which is used to provide coherent AM detection. As probably will be appreciated, the receiver processing as a whole can be considered as a coherent receiver. To achieve optimum detection, the receiver also employs a phase-lock loop which phase-locks the carrier in such a manner that coherent addition of the sideband signals can be achieved in mixer 28. Such a phase-lock loop also permits noise to be processed linearly and added in an rms manner. As shown, the phase-lock loop includes a bandpass filter 29 which is selected to pass only the center or carrier signal so that only this carrier signal is applied to the loop. A limiter 31 preferably is introduced to prevent frequency centroiding in cases where multipath interference produces a second carrier signal differing in frequency with the primary or direct signal. The limiter permits the stronger signal to be passed on so as to provide it as the carrier frequency to which the sideband signals are added in mixer 28. The functional part of the loop consists primarily of a phase detector 32, a loop filter 33 and a voltage control oscillator (VCO)34 which, in the customary manner, provides a signal phase locked to the carrier. As will be appreciated, the use of the phase-lock loop is important since it significantly improves subsequent detection and processing of the sideband components which contain the data or message being transmitted. However, it is recognized that phase locking of the type achieved by the loop is well known in the art and its end results can be achieved in a number of different manners. In general the receiver system is one in which AM detection is achieved by forming the product of the AM signal and a sinusoid that is phase locked to the carrier so as to result in optimum detection which, as explained, is achieved principally by the coherent addition of the sideband signals. The detected output, which is the output of mixer 28, then is supplied to a pair of bandpass filters 36 and 37. As will be noted, these filters also are identified in FIG. 3 as bandpass filter (PRF No. 1) and bandpass filter (PRF No. 2). The designations PRF No. 1 and PRF No. 2 relate back to the transmitter section of the system which includes the pair of PRF generators also identified as PRF No. 1 and PRF No. 2. In other words, as would be expected, the centerlines of filters 36 and 37 are matched to the pulse rates of generators 12 and 13 so as to recover and permit further processing of the data contained in the sidebands produced by modulating the carrier with one or the other of the PRF generator outputs. After filtering, the filter outputs are detected in the usual manner by envelope detectors 38 and 39 and the output of these detectors then supplied to a high gain differential amplifier 41 for conversion to a digital data format.

In general, the described arrangement provides a relatively simple manner of providing data communication in a system that uses a pulsed doppler radar with the data link of the system being on a non-interfering basis with the radar function. In addition, it can be implemented to provide improved signal-to-noise ratio so as to permit a reduction in bit error rate and an increased data link sensitivity.

Obviously many modifications and variations of the present invention are possible in the light of the above teachings. It is therefore to be understood that within the scope of the appended claims the invention may be practiced otherwise than as specifically described.

The invention claimed is:

1. A radar-compatible data link system comprising the combination of:
    radar signal transmitting means;
    radar signal return processing means, and
    a remotely-disposed radar signal receiving means:
    said transmitting means including:
        means for generating a fixed continuous wave carrier frequency,
        means for generating a plurality of differing pulse repetition frequencies (PRF'S)

means for selectively modulating said fixed carrier frequency with said generated PRF's for producing transmitter output signal pulses having said fixed carrier frequency as a center frequency component and a sideband component formed by said selected PRF, a digital data source for introducing into the system said data link information, and means controlled by said digital information for repetitively selecting the modulating PRF;

said return signal processing means including:

means for processing said fixed carrier frequency component to produce radar-return information, and said remotely-disposed receiving means including:

a matched band-pass filter for each of said PRF's, said filters each being adapted to pass as an output sideband components produced by a particular PRF generator, and differential amplifier means receivably coupled to said filter output for processing said filter means output for reconstructing said data link information whereby said system is capable of processing radar return data concurrently with the transmission of said digital data information.

2. The system of claim 1 wherein said transmitting means includes:

a directional transmitter antenna having a narrow beamwidth adapted for secure communications purposes.

3. The system of claim 1 wherein said control means for selecting the modulating PRF includes:

switching means coupled between an output of said PRF generators and said modulating means, and switch driver means operatively coupled to said data source and to said switching means for controlling said switches responsively to said digital data whereby the selection of the PRF is responsive to said digital data.

4. The system of claim 1 wherein said remotely-disposed receiving means further includes:

means for heterodyning the incoming signal to produce an intermediate frequency output, a selective bandpass filter coupled to said heterodyned output for removing said sideband components and passing as an output said fixed carrier frequency component, and a mixer for receiving and mixing said heterodyned output with said selective bandpass filter output, said mixer having an output coupled to said matched pass-band filters.

5. The system of claim 4 further including:

phase-lock circuit means coupled between the output of said selective bandpass filter and said mixer, said circuit-receiving the output of said filter and locking said output to the phase of said generated carrier frequency.

6. The system of claim 5 where said phase-lock loop includes:

a variable controlled oscillator for supplying a signal phase locked to said generated carrier frequency for enabling coherent addition of said sideband components in said mixer.

* * * * *